Patented Apr. 21, 1936

2,038,178

UNITED STATES PATENT OFFICE 2,038,178

ELECTRIC ARC WELDING

Paul E. Jerabek, East Cleveland, Ohio, assignor to The Lincoln Electric Company, Cleveland, Ohio, a corporation of Ohio No Drawing. Application June 7, 1935, Serial No. 25,429

10 Claims. (Cl. 219—8)

This invention relates as indicated to electric arc welding and particularly to the welding of steel alloy compositions which contain appreciable amounts of manganese.

More specifically, this invention relates to materials for and the method of arc welding, characterized by the fact that a bead of ferrous alloy, rich in manganese, is deposited on the work, either by melting down of a fusible electrode, or by the melting down of metallic substances carried in the covering on the weld rod or additional materials such as may be provided by means of a solid filler strip placed on the work, or additional material deposited on the work in finely divided or granular form.

This invention relates primarily to the repair and re-building or re-surfacing of high manganese steel alloy parts, such as railroad frogs and crossings, machine beds and wearing surfaces generally, where it is frequently necessary to either repair cracks in the work part or most commonly to build up the wearing surfaces of such part which has been worn away during use.

Since the weld metal deposits of the character to which this invention relates are usually required to withstand extreme working conditions, it is essential that the metal as deposited have sufficient hardness in its deposited form so as not to require any excessive amount of plastic deformation or work hardening in order to sufficiently harden the same to withstand the use to which it will be subjected such as usually occurs on railroad crossings, frogs, etc.

It has been common practice in the prior art in the production of manganese rich steel deposits of the character above referred to, to produce the same by means of a fusible weld rod, containing from about 1% to about 1.5% carbon; manganese from about 11% to about 15% and the balance being principally iron, together with the usual impurities which occur in this type of alloy composition.

The deposits produced by the melting down of weld rods having the above identified type of composition were successful only when extreme care was used in the deposit of the metal. The beads or deposited metal were required to be quenched in water from a red heat in order to preserve the predominantly austenitic structure necessary that the deposit metal have the required hardness. This quenching required to thus preserve the desired predominantly austenitic structure made it practically impossible to obtain weld metal deposits free from cracks and extreme brittleness.

It was then suggested by the workers in the prior art to add nickel to the weld metal by including substantial quantities of nickel in the composition of the weld rod core and such amounts of nickel were effective to lower the critical temperature and the rate of transformation from austenite to martensite so that upon air cooling, the deposit remained predominantly austenitic. Such deposits, however, were so brittle and subject to cracking upon cooling that the same was not a very marked improvement over the original procedure, as above defined.

Further attempts were made to cure this tendency of the deposited weld metal to crack upon cooling by lowering the carbon content to approximately 0.6%. This reduction in the amount of carbon eliminated the tendency of the deposited weld metal to crack but so softened the deposit that it was unable to develop its full hardness without first being subjected to a very large amount of cold working. When applied to wearing parts such as cross-overs and frogs and digger teeth on power shovels, the weld metal deposited failed before it had been subjected to sufficient cold working in use to develop the full hardness necessary to withstand continued use.

It is the principal object of this invention to provide a method of and materials for arc welding by which a manganese rich steel alloy may be deposited either for the purpose of repairing cracks and the like in manganese rich steel alloy articles or to repair or rebuild the wearing surfaces thereof, which deposit is characterized by the fact that proper hardness, such as is necessary to withstand the continued use to which it will be put, is developed with a minimum of preliminary cold working either before being placed into use or during the early stages of use, and which deposit is likewise characterized by the fact that it is not subject to cracking and brittleness upon cooling or prolonged use and which, furthermore, does not require to be quenched in order to retain a predominantly austenitic structure.

To the accomplishment of the foregoing and related ends, said invention, then, consists of the means hereinafter fully described and particularly pointed out in the claims, the following description setting forth in detail several methods exemplifying my invention, such disclosed methods constituting, however, various applications of the principle of the invention.

This invention may be briefly defined as the discovery that the use of specified amounts of any one or more of the elements molybdenum, vanadium and/or tungsten in a manganese rich electric arc weld deposit results in a deposit which will achieve the desired hardness with only a minimum of work hardening and without cracking or similar failure which has been the fault of weld deposits in which such characteristics were secured by the use of relatively high carbon contents.

In order that a weld metal deposit may have the desirable characteristics as above explained, the same should have a composition falling within the following range of percentages:—

Carbon _____ from about 0.50% to about 1.00%
Manganese ____ from about 7.00% to about 15.00%
Nickel _____ None to about 10.00% at least one of the following elements in the proportions given;

Molybdenum __ from about 0.10% to about 2.00%
Vanadium ____ from about 0.10% to about 1.00%
Tungsten ____ from about 0.10% to about 2.00% and the remainder being substantially iron, together with such other alloying elements and impurities as are sometimes found in this type of alloy composition.

As above indicated, nickel may be omitted entirely from the composition, in which case, however, the manganese should be present in amounts from about 10% to 15% in order for the composition to remain predominantly austenitic, upon normal cooling in an atmosphere of room temperature from the heat to which it is subjected in the arc.

It is also to be noted that cobalt may be employed in place of nickel and when cobalt is thus used as a substitute for nickel, it should be employed in approximately the same percentages as above given for nickel.

A somewhat narrower and preferred range of composition of the deposited weld metal is as follows:—

Carbon _____ from about 0.50% to about 1.00%
Manganese ____ from about 8.5 % to about 11.00%
Nickel _____ from about 4.00% to about 6.00% at least one of the following elements in the proportions given:

Molybdenum __ from about 0.35% to about 0.75%
Vanadium ____ from about 0.10% to about 0.75%
Tungsten ____ from about 0.35% to about 0.75% and the remainder being substantially iron, together with such other alloying elements and impurities as are sometimes found in this general type of alloy composition.

Due to the fact that the metal when subjected to the electric arc is elevated to a temperature usually above that encountered in the manufacture of the metal, certain amounts of elements such as carbon and manganese will be oxidized and the total amount of such elements which remain in the weld metal will, therefore, be less than those which are introduced into the arc or more particularly, the pool of metal under the arc.

There are several ways in which this desirable composition of the deposited weld metal may be secured among which are the following:—

First:—By the use of a metallic weld rod having a composition which, after being subjected to the arc, will yield a composition of the character above defined;

Second:—By the employment of a plain carbon steel fusible weld rod which is provided with an adherent covering containing or including sufficient amounts of the remaining alloying constituents so that after being subjected to the heat of the arc, the resultant material will yield a composition within the limits above defined;

Third:—By the employment of a plain carbon steel weld rod used in conjunction with an alloy steel filler strip containing sufficient of the remaining alloying constituents so that the same, when melted together and after being subjected to the heat of the arc, will yield a composition within the limits above defined;

Fourth:—By depositing a layer of finely divided alloying and slag-forming constituents on the work and then subjecting the same to an arc sprung between a fusible weld rod and the work, so that the weld rod, when melted with the alloying elements on the work, will produce the desired composition, as above defined;

Fifth:—By providing a deposit, either solid or in finely divided form, of all of the alloying elements necessary to yield the desired composition after being subjected to the arc, and then melting the same by means of an electric arc maintained between the work and a non-fusible weld rod such as carbon or the like;

Sixth:—Since a weld rod rich in manganese is difficult to manufacture, i. e., difficult to economically produce in various sizes of relatively small diameter, it is within the contemplation of this invention to employ a fusible weld rod, either coated or uncoated, which contains all or substantially all of the alloying elements required with the exception of the principal amount of manganese which may be introduced into the weld metal by some independent means, such as a filler strip or a deposit of finely divided material placed on the work in the vicinity of the arc.

As previously indicated, one of the preferred ways in which the desired composition may be produced in the deposited weld metal is by the use of a plain steel core to which there is applied an adherent covering which includes:—

1. Sufficient additional alloying elements of the character above referred to, so that after the weld rod is melted down and subjected to the heat of the arc, it will yield a composition falling within the previously defined ranges.

2. Sufficient amounts of slag-forming constituents such as titanium dioxide, asbestos, clay, etc., so that when the same are melted down under the heat of the arc, they will form a protective layer over the pool of molten metal to exclude the surrounding atmosphere therefrom.

3. A binder such as sodium silicate, which will properly secure the covering 2 of the weld rod core.

4. Optionally, a material such as cellulose which, upon decomposition by pyrolysis, will produce an inert or reducing atmosphere around the arc and over the pool of molten metal.

Inasmuch as certain of the alloying elements above mentioned, such as manganese, etc., will be oxidized in the arc, the actual recovery of such elements in the weld metal will be less than the amount present in the weld rod or filler strip. Amounts in addition to those desired in the weld metal will, therefore, be required in the weld rod in order to compensate for this loss.

Throughout the foregoing description where the composition of the deposited weld metal has been given, only those elements which are important to the present invention have been referred to. It is to be understood that throughout the foregoing description and in the appended claims the term "the remainder being substantially all iron", when used, is to include minor amounts of alloying elements and impurities such as aluminum, silicon, phosphorus, sulphur, and the like.

It is believed unnecessary to indicate the exact amounts of the various constituents such as slag-forming elements and the like which are to be used in a weld rod covering made in accordance with the present invention, since the proportional amounts of such elements for particular usages are well known to those familiar with the art.

Other modes of applying the principle of my invention may be employed instead of the one explained, change being made as regards the composition and method herein disclosed, provided the ingredients or steps stated by any of the following claims or the equivalent of such stated ingredients or steps be employed.

I therefore particularly point out and distinctly claim as my invention:—

1. An arc welding electrode comprising a suitable core and an adherent covering which when melted together under the arc will yield a weld metal deposit which upon normal cooling is predominantly austenitic and which comprises:

Carbon _____ from about 0.50% to about 1.20%
Manganese ____ from about 7.00% to about 15.00%
From the group
  comprising
  nickel and cobalt _____ from about 0.10% to about 10.00% said deposit having imparted thereto the characteristic of being able to achieve substantially maximum hardness by means of a minimum of cold work by the presence of at least one of the following additional elements in a substantial amount, not exceeding the percentage given:

Tungsten _____ about 2.00%
Molybdenum _____ about 2.00%
Vanadium _____ about 1.00% and the remainder being substantially all iron.

2. An arc welding electrode comprising a metallic core and an adherent covering which when melted together will yield a weld metal deposit which upon normal cooling is predominantly austenitic and which comprises:

Carbon _____ from about 0.50% to about 1.20%
Manganese ____ from about 7.00% to about 15.00%
Nickel _____ from about 0.10% to about 10.00% said deposit having imparted thereto the characteristic of being able to achieve substantially maximum hardness by means of a minimum of cold work by the presence of at least one of the following additional elements in a substantial amount, not exceeding the percentage given:

Tungsten _____ about 2.00%
Molybdenum _____ about 2.00%
Vanadium _____ about 1.00% and the remainder being substantially all iron.

3. A weld metal deposit which upon normal cooling is predominantly austenitic and which comprises:

Carbon _____ from about 0.50% to about 1.20%
Manganese ____ from about 7.00% to about 15.00%
From the group
  comprising
  nickel and cobalt _____ from about 0.10% to about 10.00% said deposit having imparted thereto the characteristic of being able to achieve substantially maximum hardness by means of a minimum of cold work by the presence of at least one of the following additional elements in a substantial amount, not exceeding the percentage given:

Tungsten _____ about 2.00%
Molybdenum _____ about 2.00%
Vanadium _____ about 1.00% and the remainder being substantially all iron.

4. A weld metal deposit which upon normal cooling is predominantly austenitic and which comprises:

Carbon _____ from about 0.50% to about 1.20%
Manganese __ from about 7.00% to about 15.00%
Nickel _____ from about 0.10% to about 10.00% said deposit having imparted thereto the characteristic of being able to achieve substantially maximum hardness by means of a minimum of cold work by the presence of at least one of the following additional elements in a substantial amount, not exceeding the percentage given:

Tungsten _____ about 2.00%
Molybdenum _____ about 2.00%
Vanadium _____ about 1.00% and the remainder being substantially all iron.

5. A weld metal deposit which upon normal cooling is predominantly austenitic and which comprises:

Carbon _____ from about 0.50% to about 1.20%
Manganese __ from about 7.00% to about 15.00%
Cobalt _____ from about 0.10% to about 10.00% said deposit having imparted thereto the characteristic of being able to achieve substantially maximum hardness by means of a minimum of cold work by the presence of at least one of the following additional elements in a substantial amount, not exceeding the percentage given:

Tungsten _____ about 2.00%
Molybdenum _____ about 2.00%
Vanadium _____ about 1.00% and the remainder being substantially all iron.

6. A weld metal deposit which upon normal cooling is predominantly austenitic and which comprises:

Carbon _____ from about 0.50% to about 1.20%
Manganese __ from about 7.00% to about 15.00%
From the group
  comprising
  nickel and cobalt _____ from about 0.10% to about 10.00% said deposit having imparted thereto the characteristic of being able to achieve substantially maximum hardness by means of a minimum of cold work by the presence of the following additional element in the amounts given:

Tungsten from about 0.10% to about 2.00%;
and the remainder being substantially all iron.

7. A weld metal deposit which upon normal cooling is predominantly austenitic and which comprises:

Carbon _____ from about 0.50% to about 1.20%
Manganese __ from about 7.00% to about 15.00%
From the group
  comprising
  nickel and cobalt _____ from about 0.10% to about 10.00% said deposit having imparted thereto the characteristic of being able to achieve substantially maximum hardness by means of a minimum of cold work by the presence of the following additional element in the amounts given:

Molybdenum from about 0.10% to about 2.00%; and the remainder being substantially all iron.

8. An arc welding electrode comprising a metallic core and an adherent covering which when melted together will yield a weld metal deposit which upon normal cooling is predominantly austenitic and which comprises:

Carbon_____from about 0.50% to about 1.20%
Manganese__from about 7.00% to about 15.00% said austenitic structure being stabilized by the presence of at least one of the following additional elements in a substantial amount not exceeding the percentage given:

Tungsten_____about 2.00%
Molybdenum _____about 2.00%
Vanadium_____about 1.00% and the remainder being substantially all iron.

9. A weld metal deposit which upon normal cooling is predominantly austenitic and which comprises:

Carbon_____from about 0.50% to about 1.20%
Manganese__from about 7.00% to about 15.00% said austenitic structure being stabilized by the presence of at least one of the following additional elements in a substantial amount, not exceeding the percentage given:

Tungsten_____about 2.00%
Molybdenum _____about 2.00%
Vanadium_____about 1.00% and the remainder being substantially all iron.

10. A weld metal deposit which upon normal cooling is predominantly austenitic and which comprises:

Carbon_____from about 0.50% to about 1.20%
Manganese__from about 7.00% to about 15.00%
From the group comprising nickel and cobalt_____from about 0.10% to about 10.00% said deposit having imparted thereto the characteristic of being able to achieve substantially maximum hardness by means of a minimum of cold work by the presence of the following additional element in the amount given:

Vanadium from about 0.10% to about 1.00%; and the remainder being substantially all iron.

PAUL E. JERABEK.